No. 731,801. PATENTED JUNE 23, 1903.
J. R. MARKLE.
HOT BEARING INDICATOR.
APPLICATION FILED JULY 29, 1902.
NO MODEL.
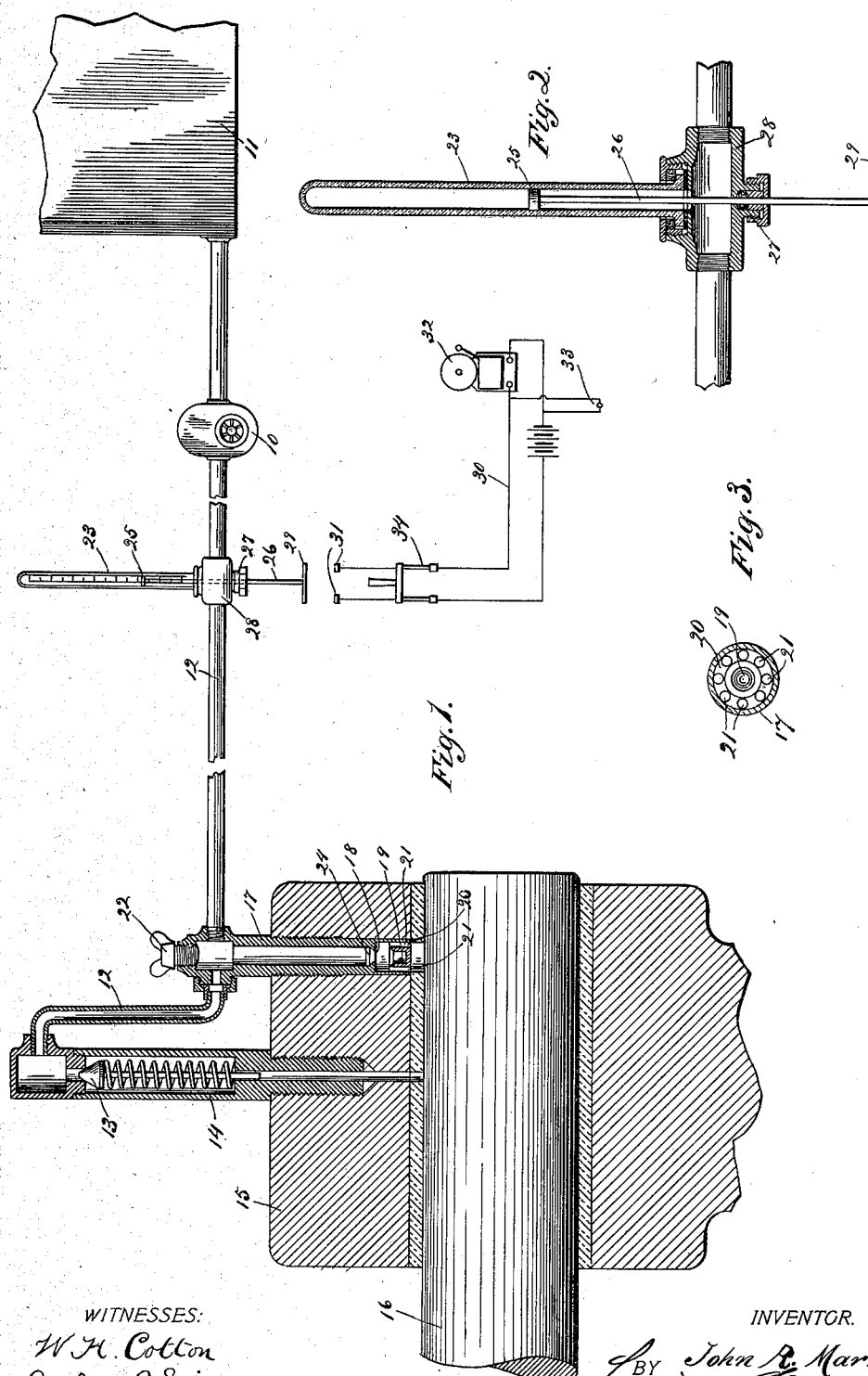
WITNESSES:
W. H. Cotton
Arthur B. Seibold
INVENTOR.
John R. Markle.
BY
ATTORNEY.

No. 731,801. Patented June 23, 1903.

UNITED STATES PATENT OFFICE.

JOHN R. MARKLE, OF CHICAGO, ILLINOIS.

HOT-BEARING INDICATOR.

SPECIFICATION forming part of Letters Patent No. 731,801, dated June 23, 1903.

Application filed July 29, 1902. Serial No. 117,472. (No model.)

*To all whom it may concern:*

Be it known that I, JOHN R. MARKLE, a citizen of the United States, and a resident of Chicago, county of Cook, and State of Illinois, have invented certain new and useful Improvements in Hot-Bearing Indicators, of which the following is a specification, and which are illustrated in the accompanying drawings, forming a part thereof.

This invention relates generally to means for indicating the existence of overheated or hot bearings and also contemplates the provision of a lubricating device so constructed and arranged that the means controlling or through whose intervention the indicating mechanism is operated or caused to perform its function will also insure the flooding of the bearing with the lubricant, so as to lower the temperature of the same.

The invention is designed to be used with any lubricator in which the lubricant is fed to the bearing under pressure, whether by gravity, air, or otherwise, but preferably with lubricators in which the oil is forced to the bearing by a hydrostatic pump. With this class of lubricators the oil is pumped from a suitable source of supply, as a tank, and delivered past a check-valve set to feed the requisite quantity of oil to the bearing, the supply-pipe being kept always full.

In carrying my invention into effect I provide an auxiliary connection leading from the oil-supply pipe to the bearing and which is located between the pump and the feed-valve, and in this connection is placed a fusible plug or other obstruction for preventing the oil from flowing through the connection to the bearing until undue heating shall appear at the latter. A suitable indicator, such as a gage-tube communicating with the oil-supply pipe and in which the oil is elevated or forced upward by the pressure from the pump or other pressure mechanism, is provided, or in lieu thereof or supplemental thereto an electrical alarm or other signal may be employed. The construction and arrangement are such that when the bearing becomes dangerously or undesirably hot the plug or other obstruction in the connection will be melted or moved from the passage thereof, thereby relieving the resistance to the pump-pressure. This will result in the fall of the oil in the gage-tube, and consequently indicate to the attendant at a central station or switchboard, where the tube is designed to be located, the hot bearing, and at the same time by reason of the removal of the obstruction in the connection the oil will flow freely to the bearing and thoroughly lubricate the same.

The invention consists of the combination and arrangement of parts hereinafter set forth, particularly designated in the claims, and illustrated in the accompanying drawings, in which—

Figure 1 is a sectional view of a bearing and a hydrostatic lubricator, showing my invention in connection therewith. Fig. 2 is a vertical section of the gage-tube seen in Fig. 1 and provided with an electric circuit-closer, and Fig. 3 is a detail sectional view showing the cup or receptacle for catching and holding the fusible plug to prevent the same when melted from falling onto the bearing.

While it is obvious that the invention may be employed with any lubricator wherein or whereby the oil is fed or forced to the bearing under pressure, I have shown the same in connection with a hydrostatic or force-feed lubricator in which the oil is forced to the bearing by a hydrostatic pump. Such lubricating apparatus is well known and consists generally, referring to Fig. 1, of a hydrostatic pump (shown conventionally at 10) by which oil contained in a tank or reservoir 11 is forced through a pipe 12 past a check-valve 13, contained in a continuation of the supply-pipe, or a plug 14, tapped in the bearing 15, to the journal 16. The check-valve illustrated is held to its seat by a spring, the tension of which may be regulated to require any desired pressure to move the valve from its seat and permit the oil to feed past the same to the bearing.

I propose now to utilize the pressure of the pump upon the oil to indicate the condition of the bearing or, to be more specific, indicate when the temperature of the bearing has risen to a dangerous point. To this end I provide a by-pass or auxiliary passage from the oil-supply pipe to the bearing and which is normally closed to the passage of oil by means of a fusible plug or other obstruction for preventing the oil from flowing through the connection until undue heating shall appear in the journal, but which when the plug is melted or the obstruction removed opens a free passage to the oil, and thereby reduces the pressure, which is indicated by a pressure-gage or other suitable means. In the construction illustrated the mechanism for accomplishing this result consists of a hollow plug 17, screwing into the bearing 15 and in communication with the journal 16 and connected up with the supply-pipe 12 between the pump 10 and the check-valve 13. This plug 17 is provided near its lower end with an internal shoulder 18 and below the shoulder is adapted to receive a cup 19, which is secured in place by screwing or otherwise, the said cup being located directly below the opening formed by the shoulder 18. The cup 19 has a flange 20 for spacing it from the wall of the lower end of the plug 17, which flange is provided with openings 21 to allow for the passage of oil when the fusible plug melts.

It is to be understood that the cup 19 is designed to catch and hold the metal plug when the latter is fused by the heat of the journal. The top of the plug 17 has an opening closed by a thumb-screw 22 and through which a pointed tool may be passed for inserting a fusible plug and also for removing the same after it has been melted, fallen down into the cup 19, and solidified. In order to permit of the removal of the plug, the opening formed by the shoulder 18 and the opening in the top of the plug 17 are both made larger than the internal diameter of the cup 19, and the shoulder 18 and the new plugs are preferably correspondingly tapered, so that the latter may be wedged securely in place when inserted in the plug 17, so as to avoid leakage. Located between the plug 17 and the pump 10 and having open communication with the supply-pipe 12 is a vertical gage-tube 23, closed at the upper end. This tube may be graduated, if desired, as seen in Fig. 1, and when so graduated may be relied upon to indicate the pressure under which the pump is working. This tube is also designed to indicate when the plug has fused on account of the heated condition of the bearing, as will now be explained. The valve 13 being under certain tension and the pump of such capacity as to force oil past the valve, such pressure will elevate the oil in the gage-glass 23 against the air confined therein. This occurs when the lubricator is working under normal conditions and a fusible plug, as 24, is in place in the plug 17 and closing the passage in the same. If now from any cause the bearing becomes heated to a predetermined degree, (and such degree is determined by the point of fusibility of the plug 24,) the plug will melt and dropping into the cup 19 permit the oil to flow freely to the bearing and flood the same. This relieves the pressure on the system, and the oil in the tube 23 will immediately drop back into the pipe 12 and pass to the bearing, indicating to the attendant the heated condition of the particular bearing indicated by the tube, it being understood that each bearing will have its own indicator, and in large establishments, where there are a great number of bearings to be looked after, indicators, such as 23, may be mounted upon a board and numbered to correspond with the bearings indicated thereby.

In lieu of using the tube 23 as an indicator or supplemental thereto an electric or other alarm or indicator may be employed. To this end the tube 23 may be provided with a piston 25, to which is fixed a rod 26, projecting through a stuffing-box 27 in the bottom of the coupling 28, to which the tube 23 is attached. The lower end of the piston-rod has a circuit-closer 29 secured thereto and insulated therefrom, designed to close an electric circuit 30 by moving down against the terminals 31 thereof and ring an alarm 32. An incandescent lamp 33 or other indicating device in shunt with the alarm may be provided, as will be readily understood, to provide a visual indicator.

With the electrical signal and indicator when the fusible plug 24 burns out the lowering of the pressure will permit the compressed air in the tube 23 to force the piston downward, moving the circuit-closer against the terminals 31 of the circuit, which, then being closed, sounds the alarm and lights the lamp or actuates any other indicating device. A switch 34 is designed to open the circuit when closed by the circuit-closer 29 to prevent exhausting of the battery while the pump is not in operation.

The indicator 23, as well as the electrical alarm, also serves to indicate if the pump is not working properly. If any failure should occur in the latter, the pressure being reduced, the oil in the tube 23 would of course fall.

In case of a fire near the bearing the fusible plug would be melted and the location of the fire fixed by means of the indicating-tube 23—that is to say, the attendant having his attention called to the bearing he would discover the fire.

With large installations in great manufacturing establishments and power-houses it is evident that should a fire occur at any point about the system of piping the oil therein would quickly be heated and gasified and at once melt the nearest fusible plug and ring the alarm, and thus operate the system as a general fire-alarm.

I claim as my invention—

1. In combination, a journal-bearing having a fluid-passage, a fusible plug closing the passage, and a receptacle in the passage below the fusible plug.

2. In combination, a journal-bearing having a fluid-passage, a shoulder in the passage, a fusible plug closing the passage and resting upon the shoulder, and a cup in the passage under the shoulder and having an oil-passage at the side of the same.

3. In a hot-bearing indicator, in combination, means containing a fluid-passage communicating with the bearing, a normally closed heat-controlled valve for the passage, an oil-supply pipe leading to the passage, and a pressure-indicator in communication with the supply-pipe.

4. In combination, a bearing, a conduit leading thereto, means for feeding oil to the conduit under pressure, a valve in the conduit near the outlet thereof, means tending to seat the valve in opposition to the flow of lubricant, and a pressure-indicator communicating with the conduit, between the bearing and the pressure means.

5. In combination, a bearing, an oil-reservoir, a conduit leading from the reservoir to the bearing, means for feeding the oil from the reservoir through the conduit under pressure, a valve in the conduit near the outlet thereof, a spring tending to seat the valve in opposition to the pressure means, and a pressure-indicator communicating with the conduit, between the bearing and the pressure means.

6. In combination, a bearing, a supply-pipe leading to the bearing, a normally closed valve in the supply-pipe, means for delivering oil to the supply-pipe under pressure, an auxiliary connection between the supply-pipe and the bearing, and a fusible plug located in the connection.

7. In combination, a bearing, a supply-pipe leading to the bearing, a spring-closed valve in the supply-pipe, a reservoir, a pump for forcing oil from the reservoir through the supply-pipe, an auxiliary connection between the supply-pipe and the bearing, and a fusible plug in the connection.

8. In combination, a bearing, a pipe for delivering a lubricant thereto, an auxiliary connection between the lubricant-supply pipe and the bearing, a heat-controlled obstruction in the connection, and an indicator in communication with the supply-pipe.

9. In combination, a bearing, a pipe for delivering a lubricant thereto, an auxiliary connection between the lubricant-supply pipe and the bearing, a fusible plug in the connection, and a pressure-indicator in communication with the supply-pipe.

10. In combination, a bearing, a reservoir, a supply-pipe leading from the reservoir to the bearing, means for delivering oil from the reservoir through the supply-pipe under pressure, an auxiliary connection between the oil-supply pipe and the bearing, a fusible plug in the connection, and a pressure-indicator communicating with the supply-pipe.

11. In combination, a bearing, an oil-reservoir, a supply-pipe leading from the reservoir to the bearing, a pump for delivering oil from the reservoir through the supply-pipe, a check-valve in the pipe, means tending to seat the valve against the pump-pressure, an auxiliary connection leading from the supply-pipe to the bearing between the check-valve and the pump, a fusible plug in the connection, and a vertical indicating-tube communicating with the supply-pipe.

12. In combination, a bearing, a reservoir, a supply-pipe leading from the reservoir to the bearing, means for delivering oil from the reservoir through the supply-pipe under pressure, a check-valve in the pipe, a spring tending to seat the valve in opposition to the pressure means, an auxiliary connection leading from the supply-pipe to the bearing between the check-valve and the oil-delivering means, a fusible plug in the connection, and a cup located in the connection below the fusible plug.

13. In combination, a bearing, a reservoir, a supply-pipe leading to the bearing, means for delivering oil from the reservoir through the supply-pipe under pressure, a check-valve in the pipe, a spring tending to seat the valve in opposition to the pressure means, a connection leading from the supply-pipe to the bearing between the check-valve and the oil-delivering means, a fusible plug in the connection, a vertical tube communicating with the supply-pipe closed at its outer end, a piston in the tube, an electrical circuit and an indicating device in said circuit, and means controlled by the piston for closing the circuit to actuate the indicating device.

14. In combination, a bearing, a reservoir, a supply-pipe leading from the reservoir to the bearing, a pump for delivering oil from the reservoir through the supply-pipe, a check-valve at the outlet of the supply-pipe, a spring tending to seat the valve in opposition to the pump-pressure, an auxiliary connection leading from the supply-pipe to the bearing between the check-valve and the pump, a fusible plug in the connection, a vertical tube communicating with the supply-pipe closed at its outer end, a piston in the tube, a rod fixed to the piston and provided with a circuit-closer, and an electrical circuit and an alarm in said circuit, the terminals of the circuit being in the path of the circuit-closer.

15. In combination, a journal-bearing having a fluid-passage, a fusible plug closing the passage, and a cup in the passage and located below the fusible plug.

16. In combination, a journal-bearing having a fluid-passage, a normally closed heat-controlled obstruction in the passage, a supply-pipe, means for delivering oil to the supply-pipe under pressure, a tube communicating with the supply-pipe, a piston in the tube, an electrical circuit and an alarm in said circuit, and a circuit-closer carried by the piston.

17. In combination, a bearing, a pipe for delivering a lubricant to the bearing, an auxiliary connection between the lubricant-supply pipe and the bearing, a fusible plug in the connection, and a slight-pressure indicator in communication with the supply-pipe.

18. In combination with a journal-bearing having a fluid-passage, a seat in the passage, a fusible plug resting on said seat, a cup in the passage under the seat and having an oil-passage at the side of the same, and a removable cap closing the upper end of the fluid-passage, the cross-sectional internal area of the cup being less than that of the fluid-passage and the passage through the seat.

19. In combination, a bearing, an oil-reservoir, a conduit leading from the reservoir to the bearing, a pump for feeding the oil from the reservoir through the conduit under pressure, a check-valve in the conduit near the outlet thereof, a spring tending to seat the valve in opposition to the pump, and a pressure-indicator communicating with the conduit between the bearing and the pump.

JOHN R. MARKLE.

Witnesses:
ARTHUR B. SEIBOLD,
LOUIS K. GILLSON.